No. 853,364. PATENTED MAY 14, 1907.
M. C. HONEYWELL.
VALVE.
APPLICATION FILED OCT. 31, 1906.
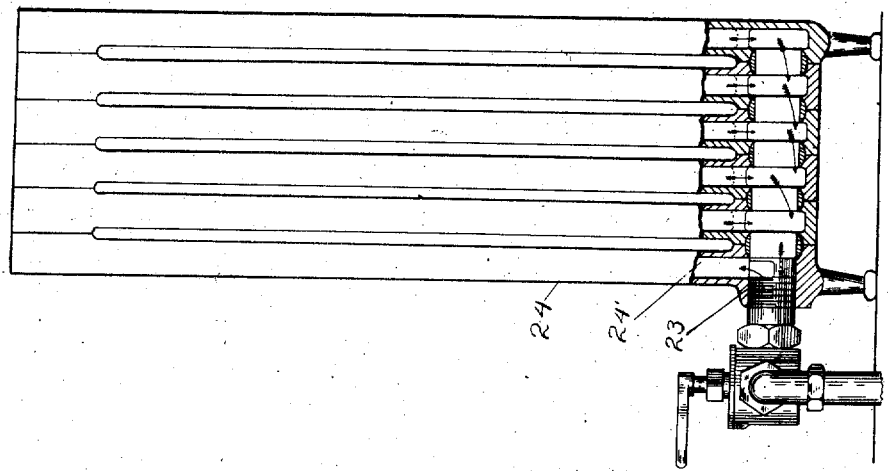
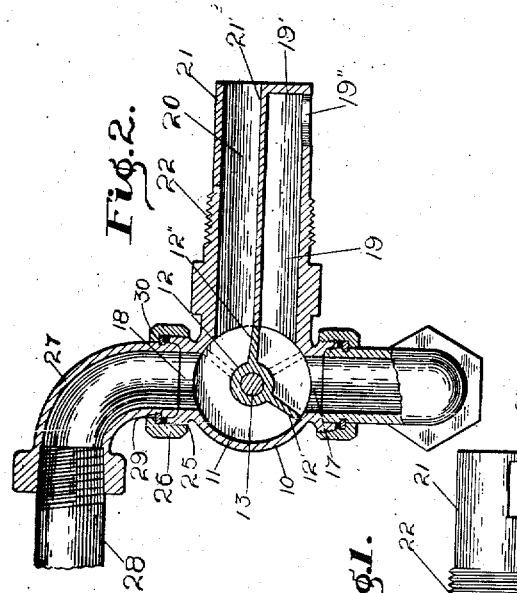
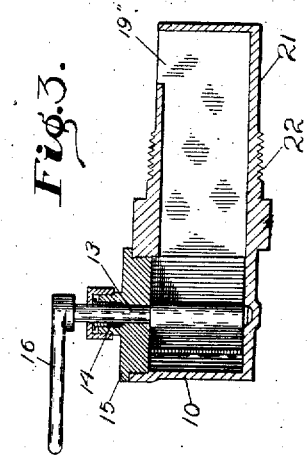
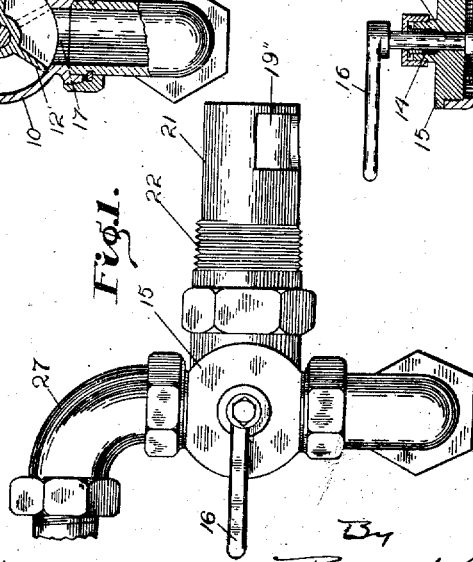
Witnesses
W. R. Blendening
Thomas W. McMearn
Inventor
Mark C. Honeywell.
By Bradford Hood
Attorneys

UNITED STATES PATENT OFFICE.

MARK C. HONEYWELL, OF WABASH, INDIANA.

VALVE.

No. 853,364.   Specification of Letters Patent.   Patented May 14, 1907.

Application filed October 31, 1906. Serial No. 341,457.

*To all whom it may concern:*

Be it known that I, MARK C. HONEYWELL, a citizen of the United States, residing at Wabash, in the county of Wabash and State of Indiana, have invented certain new and useful Improvements in Valves, of which the following is a specification.

The object of my invention is to produce a valve for controlling the flow of a fluid, for instance to a radiator, the construction being such that, no matter what the position of the valve may be, the circulating flow through the feeder pipes will not be interrupted.

A further object of my invention is to produce in a single structure a valve to receive both the induction and eduction feeder pipes from any direction.

The accompanying drawings illustrate my invention:

Figure 1 is a plan of my improved valve; Fig. 2, a horizontal section; Fig. 3, a vertical section, and Fig. 4 a vertical section of a standard radiator showing my improved valve connected therewith.

In the drawings, 10 indicates a main valve body having formed therein a valve chamber 11 which, in the present case, is cylindrical. Journaled in chamber 11 is a valve 12 having divergent wings 12' and 12" which extend to the wall of the chamber. Valve 12 is provided with a stem 13 which extends through a suitable packing gland 14, carried by the cap 15, and is provided at its outer end with a suitable operating handle 16. Leading into chamber 10 is an induction opening 17 and leading from said chamber, preferably diametrically opposite therefrom, is an eduction opening 18. Also communicating with the chamber 10 are two circulation passages 19 and 20. These two passages are formed within a cylindrical spud 21 which, in the present case, is adapted to be externally threaded as at 22 and inserted in the usual opening 23 of a radiator 24.

The two passages 19 and 20 are separated by a partition 21', the inner end of which is arranged so that the outer end of wing 12" of the valve 12 may be brought into registry therewith. The outer end of passage 20 is open while the outer end of passage 19 is preferably closed by a wall 19', egress from the passage being had through an opening 19" formed through the wall of spud 21 closely adjacent the top of partition 21'.

In order that connections may be made between the valve structure and feeder pipes I provide the outer end of each of the passages 17 and 18 with a threaded portion 25 adapted to receive the member 26 of na ordinary union carried by a fitting 27. In the present case I have shown the fittings 27 as ells and, in order that they may be made to receive ordinary pipes 28 I provide the inner end with a groove 29 into which may be sprung a split ring 30, said ring being sprung into place after the member 26 has been slipped over the inner end of the fitting.

The operation is as follows: Spud 21 is screwed into opening 23 of the radiator 24 and opening 19" brought into registry with the first passage 24' of the radiator. Fittings 27 may then be independently swung around so as to receive the feeder pipes from any direction. By swinging valve 12 to the position shown in full lines in Fig. 2 the fluid, approaching through opening 17 will be deflected into passage 19 and out through opening 19", returning through passage 20 and flowing out through opening 18. By turning valve 12 to the position shown in dotted lines in Fig. 2 any fluid within passages 19 and 20 (and the radiator or other body communicating therewith) is confined therein, and at the same time direct communication is established between openings 17 and 18, thus permitting a direct flow through the feeder pipes.

The structure is especially designed for and applicable to heating systems especially of the hot water type. It will be noted that, when the valve is closed—*i. e.* communication between the feeder pipes and radiator interrupted, the circulation through the feeder pipes is not interrupted and the body of fluid in the radiator is retained. Consequently, when the valve is opened, there is an immediate flow of hot water into the radiator. It will be noticed that, with this valve several radiators may be connected to the same feeder line in series and each radiator may be cut out without affecting any of the others.

I claim as my invention:

1. The combination, with a valve casing comprising a main cylindrical body having an induction opening leading into one side, an eduction opening leading from the opposite side and a spud intermediate said openings, of a longitudinal partition arranged within said spud and dividing the interior thereof into a pair of circulation passages, and a valve rotatably mounted within the main cylindrical body and adapted to connect the induction and eduction passages, or to connect the induction passage with one of the circulation passages and the eduction passage with the other circulation passage.

2. The combination, with a valve casing comprising a main cylindrical body having an induction opening leading into one side, an eduction opening leading from the opposite side and a spud intermediate said openings, of a longitudinal partition arranged within said spud and dividing the interior thereof into a pair of circulation passages, and a valve rotatably mounted in said main cylindrical portion and comprising a central hub and a pair of divergent wings, one of which is adapted to be brought into registry with a partition in the spud whereby the induction opening may be connected with one of the circulation passages and the eduction opening connected with the other of said circulating passages, or, by shifting the said wing out of registry with the aforesaid partition, the induction and eduction openings may be connected.

In witness whereof, I, have hereunto set my hand and seal at Indianapolis, Indiana, this 24th day of October, A. D. one thousand nine hundred and six.

MARK C. HONEYWELL. [L. S.]

Witnesses:
ARTHUR M. HOOD,
THOMAS W. MCMEANS.